United States Patent [19]
de Putter

[11] 4,077,758
[45] Mar. 7, 1978

[54] DEVICE FOR DEFORMING HOLLOW SECTIONS

[75] Inventor: Warner Jan de Putter, 11, Jan van Arkelstraat, Hardenberg, Netherlands

[73] Assignee: Warner Jan de Putter, Zwolie, Netherlands

[21] Appl. No.: 238,191

[22] Filed: Mar. 27, 1972

[30] Foreign Application Priority Data

Mar. 26, 1971 Netherlands .......................... 7104137
Mar. 26, 1971 Netherlands .......................... 7104138

[51] Int. Cl.$^2$ ...................... B29D 23/03; B29D 23/04
[52] U.S. Cl. ............................. 425/387.1; 425/326.1; 425/392
[58] Field of Search .................... 425/387 B, 392, 389, 425/393, 326.1

[56] References Cited

U.S. PATENT DOCUMENTS

| | | | |
|---|---|---|---|
| 3,104,422 | 9/1963 | Branick | 425/389 |
| 3,280,430 | 10/1966 | Antrobus | 425/387 |
| 3,377,659 | 4/1968 | Hucks, Jr. | 425/392 |
| 3,425,093 | 2/1969 | Ansette | 425/389 |
| 3,671,349 | 6/1972 | Westlake | 425/393 |
| 3,711,232 | 1/1973 | Van Zon | 425/389 |
| 3,843,302 | 10/1974 | Petzetakis | 425/393 |

FOREIGN PATENT DOCUMENTS

1,286,741 1/1969 Germany .......................... 425/393

*Primary Examiner*—Francis S. Husar
*Attorney, Agent, or Firm*—Irving M. Weiner; Pamela S. Austin

[57] ABSTRACT

A method and device for forming grooves in a thermoplastic pipe, by surrounding said pipe with a mould having one or more grooves in its interior wall and positioning one or two annular chambers into said pipe, a flexible sealing circular body being sealingly movable in said chamber, and the outer circumference of said body in its free state being substantially equal to the inner circumference of the mould part facing said ring minus about twice the wall thickness of the pipe in its final state. The circular body can be retracted into the annular chamber which is provided with a bottom part having a clover-leaf-like cross section, the circumference of said cross section being substantially equal to the inner circumference of said circular body.

3 Claims, 3 Drawing Figures

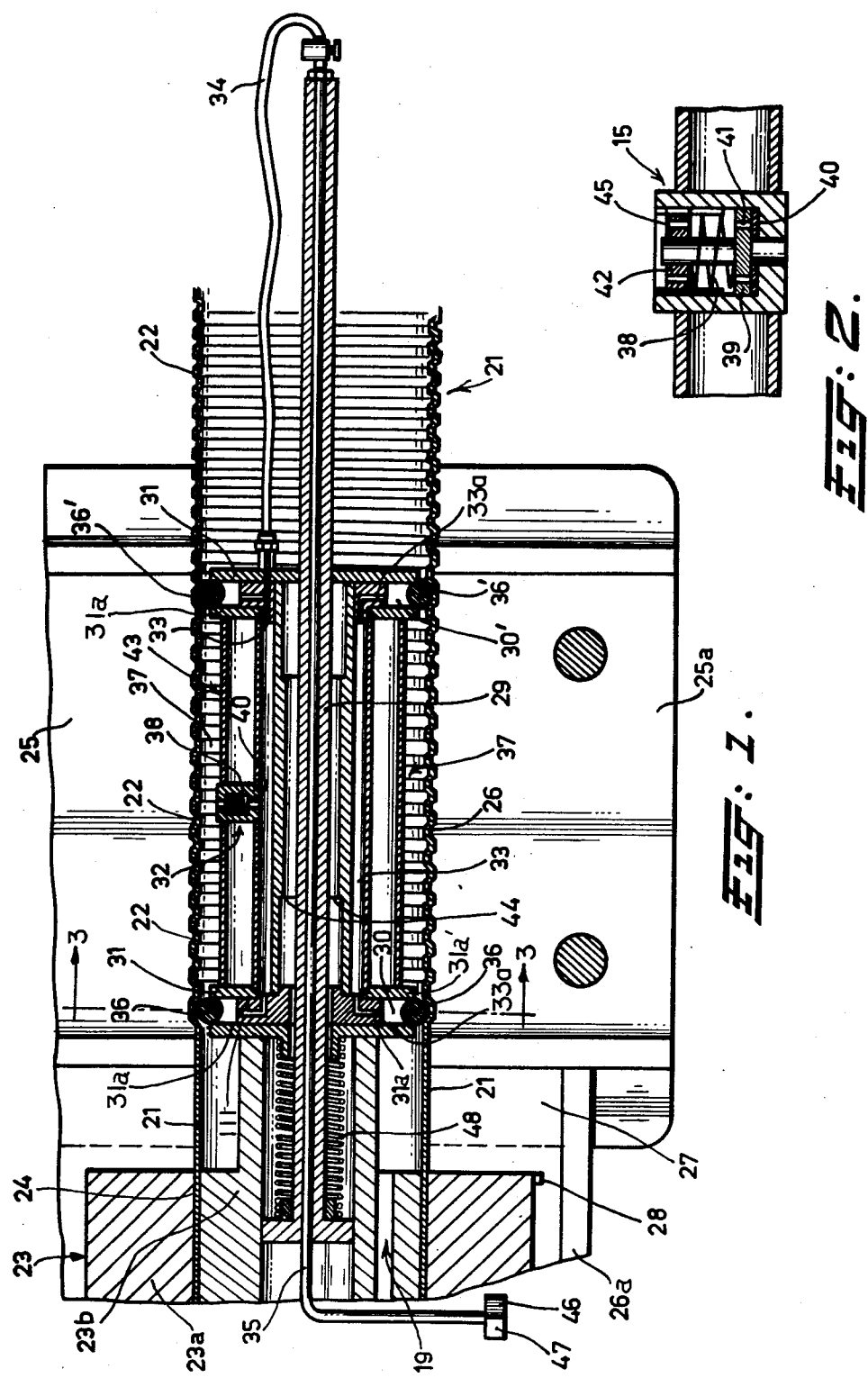

DEVICE FOR DEFORMING HOLLOW SECTIONS

BACKGROUND OF THE INVENTION

The invention relates to a device for deforming, and particularly for grooving, hollow sections.

Many methods are already known for deforming plastic pipes and providing same with inner grooves.

Another drawback is that injuries to the formed groove and ring are produced as the expansible rubber ring or a ring of a like elastical material after the compressed medium has been removed therefrom often remains in contact with the pipe whereby the walls of the groove are exposed to particular undesired deformations and moreover the ring is damaged or subjected to wear.

A more serious drawback is in that with this known method the used ring of rubber or analogous material is again and again stretched with each formation of a groove, so that after about 150 groove formations the ring should be replaced.

It is also known to subject parts of pipes made of thermoplastic material, which are in a heat deformable condition, to an inner fluid pressure, whereby the part of the pipe which is subjected to the inner fluid pressure is closed by closing discs carrying at their ends, situated in the vicinity of the inner wall of the plastic pipe, expansible sealing rings. In that case a plastic made pipe is e.g. surrounded by a die provided with recesses for the formation of transverse grooves in the pipe.

In these known devices it is necessary for a continuous process that the discs with sealings enclosing the space where the plastic section should be subjected to an inner fluid pressure are movably supported on a suspension rod protruding e.g. from an extruder. After a final position has been reached the compressed medium is again caused to escape from the sealing rings, so that the assembly comprising the discs with the sealing rings can simultaneously with the dies or die halves, return to the initial position, whereupon due to expansion of the sealing rings, an inner fluid pressure can be generated in another part of the pipe.

SUMMARY OF THE INVENTION

The invention now relates to an improved device for deforming hollow sections, particularly sections of thermoplastic material, comprising at least one chamber, delimited by two walls or discs, in which sealingly a flexible annular sealing body can move outwards due to the effect of a first pressure fluid which via at least one opening is admitted to the chamber and can be discharged therefrom, the annular sealing body for the expansion in a radial direction having an outer circumference greater than the circumference of the walls or discs and which is further provided with means for retracting the sealing body so that it can be entirely accommodated in the chamber, the outer diameter of the annular body in a free state being substantially equal to the inner diameter of the part of the mould facing said chamber minus twice the wall thickness of the tubular body in the final deformed state lying opposite said chamber.

These retracting means consist of a vacuum suction device for generating an under pressure in the chamber in the space situated within the sectional area of the interior of the sealing body. It is particularly advisable that the chamber consists of two spaced surfaces connected by a connecting part which as contemplated in cross-section comprises inwardly curved surfaces, the circumference of the cross-section being slightly less than the inner circumference of the sealing ring.

In a particularly advantageous embodiment of the connecting part, the cross section is formed with inwardly curved walls and rounded corners.

The invention will be clarified with reference to the drawing representing a number of embodiments.

SURVEY OF THE DRAWINGS

FIG. 1 shows a device for the deformation of hollow plastic bodies.

FIG. 2 shows a detail of the device according to FIG. 1.

FIG. 3 shows a cross-section taken along line 3—3 in FIG. 1.

Figure 5:
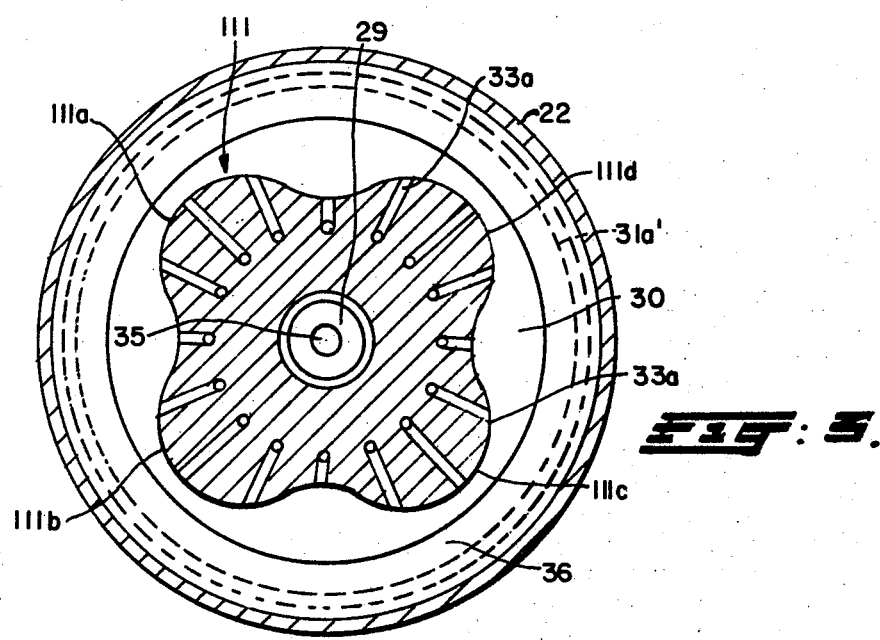

DESCRIPTION OF PREFERRED EMBODIMENTS:

In FIG. 1 a device is represented for manufacturing a flexible thermoplastic pipe 21 of polyvinylchloride with transverse grooves 22. This device consists of a partially represented extruder consisting of a core 23b and a casing 23a with an annular nozzle 24 and two die halves 25 and 25a. Each die half 25, 25a is semi-tubular and provided with a ribbed profile 26. The two die halves 25, 25a are movable in the longitudinal direction in guides (not shown) and can be driven by drive rollers. The opposite die halves 25, 25a complete one the other in their operative position by their mold cavities to form a hollow mold.

For the formation of the grooves 22 in the plastic pipe 21 the device is provided with a pipe-inflating member movable in the operative range of the hollow mold, formed by the die halves 25, 25a, and on a suspension rod 29 connected with the core 23b, the inflating member comprising two sealing devices, each comprising a chamber 30 and 30', and a first outlet 33a for the medium opening into these chambers. Another outlet 32 for the medium is provided on a cylinder 33 and between the chambers, which via a hose 34 is connected with the tube 35 extending through the core 23b. The cylinder 33 carries at its end the chambers 30 and 30'. In the other medium outlet 32 are adjustable pressure regulating means 38, in such a way that another pressure fluid which is supplied via the tube 35 extending through the core 23b and via the hose 34, cannot immediately flow off via another outlet 32 for the medium before the sealing rings 36 and 36', cooperate with the pipe 21 and a closed space 37 is formed which is delimited by the two chambers 30, 30' and the sealing rings 36 and 36'. Via the hose 34 a pressure medium such as air, oil etc. from the tube 35 can press the rubber rings 36 and 36' partially out of the chambers 30 and 30'.

The pressure regulating means 38 consist of a spring loaded cut-off valve 39 which cooperates with a seat 40. In the valve body 39 passage openings 41 are provided allowing the passage of medium when the valve body 39 is lifted from the seat; this pressure fluid can then flow, via the apertures 45 in the plate retaining the spring, from the outer outlet for the medium. The pipe inflating member 43 is supported in bearings on the rod 29. The space available between the bearings 44 enables the space, obtained when the pipe inflating member 43 is displaced, delimited by the pipe 21, core 23b and chamber 30, to communicate with the surroundings. If desired a second bore 19 may be provided in the core, opening on the one hand on the outer side of the device and on the other hand into the core within the annular nozzle 24.

For delimiting the displacement of the movable pipe-inflating member 43, a microswitch 28 is connected with a pressure fluid source, e.g., a compressor 46. The microswitch 28 can also operate a vacuum pump 47. When the movable pipe inflating member 43 has reached its rightmost position (as viewed in FIG. 1), the microswitch 28 will operate vacuum pump 47 so that the rings 36, 36' are drawn into the chambers 30, 30', and thus the pipe inflating member 43 will be drawn to the left (as viewed in FIG. 1) due to the action of spring 48. Thereafter, the microswitch 28 will operate the compressor 46 so that the rings 36, 36' are again moved outwardly.

The movable pipe-inflating member 43 is also connected with means for moving this member from its final position to a starting position; these means consist of a spring 48 connected with the core 23b. It is obvious that instead of a spring also other means can be used to return the pipe-inflating member to its original position.

The device operates as follows:

An extruder 23 extrudes a plastic pipe from the annular nozzle 24, the pipe being introduced into the hollow mould consisting of two die halves, one completing the other. After the plastic pipe has been introduced into this hollow mold, pressure fluid, e.g. compressed air, is admitted via the tube 35 and the hose 34 to the cylinder 33. Due to the suitable adjustment of the pressure of the spring 38 on the cut off valve 39 provided with passage openings, which is held against the seat 40, at first the pressure fluid is admitted via the bores 33a to the chambers 30 and 30'. After the closing, rings 36 and 36' almost completely cooperate with the plastic pipe 21 and this plastic pipe 21 cooperates in turn with the die halves 25, 25a. The pressure in the cylinder 33 rises in such a way that the pressure medium can escape via the cut off valve 39 into the space delimited by the plastic pipe 21 and the chambers 30 and 30' and the cylinder 33. Under the influence of the prevailing pressure the plastic pipe 21 is pressed into the ribbed profiles 26 of the die halves 25, 25a, so that transverse grooves 22 are formed in the pipe 21. During the inflation the movable pipe-inflating member 43 moves along with the plastic pipe 21 and the likewise moving die halves 25, 25a until the microswitch 28 is operated by a not shown protruding part of the semi-circular part 26a. At that moment the microswitch 28 operates the compressor 46, so that the latter is disconnected and the tube 35, the hose 34 and the cylinder 33 are connected to an exhaust member, viz., the vacuum pump 47. The pressure medium is thereby removed from the cylinder 33 and the rings 36, 36' return to the chambers 30 and 30'. Due to the action of the spring 48 the pipe-inflating assembly 43 is returned to its starting position, while it is arranged for that the sealing ring 36, 36' when the same is again outwards pressed cooperates again with the part of the plastic pipe 21 which is provided with transverse grooves 22. Simultaneously the microswitch 28 moves the die halves 25, 25a apart so that they return to their initial position. Since owing to the movement of the pipe inflating assembly 43 too high a pressure could develop, e.g., owing to leakage of for instance air between the sealing ring 36 and the pipe 21, in the space obtained between the pipe 21 the annular nozzle 24 and the sealing ring 36, a second bore 19 is provided going through the core, which on the one hand opens into the space between the annular nozzle 24 and the suspension rod 29 and on the other hand into the atmosphere, whereby the pressure fluid escaping via the closing ring 36 can flow outwardly and no undesired deformation of the plastic pipe between the sealing ring 36 and the annular nozzle 24 of the extruder will be produced. In this case, too, a connecting wall (FIG. 3) presents in cross-section a four leaf clover shape. The outer circumference of the rings 36 and 36' is identical to the inner diameter of the undeformed pipe when said rings contact the non-deformed parts of the pipe.

When the rings 36 and 36' come to lie in a groove, which may be achieved by a suitable selection of the circumstances, the outer circumference of the rings 36 and 36' will be equal to the inner diameter of the pipe at the location of the groove. This applies obviously when closed transverse grooves are provided.

When pipes with helically extending grooves are formed the outer circumference of the rings 36 and 36' should have a size which is related thereto.

The rings 36 and 36' should always have such dimensions that, when the rings sealingly cooperate with the inner sides of the pipes, the chambers 30 and 30' are likewise sealed by the rings, and said rings 36, 36' are not subjected to stress.

The advantage of the device mentioned hereinbefore is particularly in that by selecting the circumference of the ring as large as the circumference of the inner wall against which the ring faces on sealing the ring will never be exposed to a tensile stress.

This is especially advantageous with a device as represented in FIG. 1 since in that case the process is carried out at a rather high temperature, in case of polyvinylchloride a temperature of 160° C.

Due to the provision of a connecting wall four leaf clover shape in cross-section in the chambers in which the sealing rings are moving, a perfect confinement of the ring, which in principle is too large, in the chamber is obtained. Particularly in deforming hollow sections at high temperatures this is of great importance since when the ring protrudes from the chambers this may give rise to undesired deformations within such pipes.

Although in the present example there is question of creating a vacuum for keeping the ring 36, 36' in the chamber 30, 30' it is evident that also other means can be used to ensure a full accommodation of the ring 36, 36' in the annular chamber 30, 30'. So for instance by providing the ring 36, 36' with metal parts on the side of the ring which is turned toward a connecting part 105, those metal parts can be attracted by a magnet to be excited which is mounted in the connecting part 105.

According to the invention the groove forming ring 36, 36' has an outer circumference such that it is substantially equal to the inner circumference of the groove to be formed; this means that the outer circumference of the ring in the free condition is greater than the circumference of the walls 31 of the chamber 30 at its free end.

It is not requisite that the ring 36 have a circular cross section, since also rings with, e.g., a hexagonal or square, elliptic cross section, respectively, can be used.

The shape of the ring can also be influenced by the distance between the walls 31 and 31a since when the distance between the walls 31 and 31a is small, the ring 36 should have a smaller radius. The ring 36, 36' may be hollow and provided with a second connection for the introduction of a second compression medium, e.g., a gas or a liquid medium into the interior of the ring so that a different hardness can be imparted to the sealing ring 36, 36'. So e.g. a medium can be introduced into the ring with a pressure of 10 atmospheres, but also a medium at a pressure of 14 atmospheres.

Due to a change of the inner pressure the hardness of the ring can be related to the properties of the plastic to be deformed.

A particularly advantageous embodiment of the device is represented in FIG. 3, as a connecting wall 111, connecting the walls 31 and 31a and having a clover leaf shape in cross section. Due to the provision of apertures 33a in the various wall parts of the four leaf clover shaped connecting wall 111 it suffices to provide a small spacing between the inner periphery of the sealing ring 36 and the angular points 111a, 111b, 111c and 111d of the clover leaf-shaped connecting wall 111. The ring 36, 36' has a cross section which exactly corresponds with the distance between the walls 31, 31a. The outer edge 31a of wall 31a is shown in FIGS. 1 and 3.

The circumference of the cross section of the clover leaf connecting wall 111 is on the other hand less than the inner circumference of the ring 36. Due to the creation of a vacuum in the chamber 30, via the openings 33a in the connecting wall 111, the ring can be held pressed against the clover leaf shaped connecting wall 111, whereby it is ensured that the ring, 36 after the formation of the grooves can never remain in contact with the plastic pipe.

The ring 36 consists of a heat resistant silicon- or fluo-rubber. When the ring 36 is hollow it is advisable to introduce a non-compressible compression medium as a second compression medium into the ring 36. This may e.g. be a liquid like a silicon oil or another oil resistant to the temperature during deformation. On the other hand, however, such a liquid should not affect the materials used for the ring 36.

I claim:

1. A device for deforming hollow sections of thermoplastic material comprising:
    an elongated hollow mold for surrounding a hollow section to be deformed;
    a pipe-inflating assembly having at least two spaced chambers disposed within the interior of said hollow mold;
    each said chamber being disposed between two walls;
    a flexible solid sealing ring sealingly disposed between said walls to define the outer periphery of said chamber and being radially outwardly movable in its entirety relative to said walls;
    a first pressure fluid source in communication with each said chamber to at least one opening provided therein for admitting and discharging a first fluid under pressure to each said chamber to expand and move each said solid sealing ring in its entirety relative to said two walls;
    each said solid sealing ring is unstretched in its expanded position;
    each said solid sealing ring having an outer circumference which is greater than the outer circumference of said walls;
    means for retracting each said solid sealing ring so that it can be entirely accommodated in its associated annular chamber;
    said retracting means being in communication with each said chamber to said at least one opening therein;
    each of said two walls having a radial surface which is disposed substantially perpendicular to the longitudinal axis of said hollow mold and upon which surface said solid sealing ring moves while sealing its associated annular chamber;
    wherein said outer circumference of each said solid sealing ring in its unstressed condition is substantially equal to the inner diameter of said hollow section in its final deformed state; and a connecting part interconnecting said two walls, said connecting part having cusps pointing toward said longitudinal axis of said hollow mold, and the outer circumference of the connecting part being spaced radially inward of the inner circumference of said solid sealing ring to define the inner periphery of said chamber.

2. A device according to claim 1, wherein said connecting part, said solid sealing ring, and said radial surface of said two walls comprise the elements forming said chamber.

3. A device according to claim 1, which further comprises a first rod interconnecting the two chambers to form a second assembly, a suspension rod movably supporting said first rod and chambers and being connected with the core of an extruder, and a retracting member for retracting the suspension rod, said first rod and the two chambers to their original position after moving to an extreme position, said retracting member being operably connected to and located between said second assembly and said suspension rod.

* * * * *

UNITED STATES PATENT AND TRADEMARK OFFICE
CERTIFICATE OF CORRECTION

PATENT NO. : 4,077,758
DATED      : March 7, 1978
INVENTOR(S) : Warner Jan de Putter It is certified that error appears in the above-identified patent and that said Letters Patent are hereby corrected as shown below:

On the title sheet, left column, lines 6 and 7, change the Assignee designation from "[73] Assignee: Warner Jan de Putter, Zwolie, Netherlands" to -- [73] Assignee: Industriele Onderneming Wavin N.V., Zwolle, Netherlands --.

Signed and Sealed this

Twenty-fourth Day of April 1979

[SEAL]

Attest:

RUTH C. MASON
Attesting Officer

DONALD W. BANNER
Commissioner of Patents and Trademarks